(12) United States Patent
Martin

(10) Patent No.: US 11,458,613 B2
(45) Date of Patent: Oct. 4, 2022

(54) APPARATUSES AND METHODS FOR ACCESSING SPACES LOCATED ABOVE LOW-PROFILE OBSTRUCTIONS

(71) Applicant: Jeffrey A. Martin, DeMotte, IN (US)

(72) Inventor: Jeffrey A. Martin, DeMotte, IN (US)

(*) Notice: Subject to any disclaimer, the term of this patent is extended or adjusted under 35 U.S.C. 154(b) by 0 days.

(21) Appl. No.: 17/113,913

(22) Filed: Dec. 7, 2020

(65) Prior Publication Data

US 2021/0170569 A1 Jun. 10, 2021

Related U.S. Application Data

(60) Provisional application No. 62/943,907, filed on Dec. 5, 2019.

(51) Int. Cl.
*B62B 11/00* (2006.01)
*B25H 5/00* (2006.01)
*B62B 3/02* (2006.01)

(52) U.S. Cl.
CPC .............. *B25H 5/00* (2013.01); *B62B 3/022* (2013.01)

(58) Field of Classification Search
CPC .... B25H 5/00; B25H 3/02; B25H 3/00; B62B 3/02; B62B 3/022; B62B 3/00; B62B 5/0093; B62B 5/0083; B62B 2205/32; B62B 2205/12; B62B 2205/14; B62B 2205/30; B62B 2202/42; B62B 2202/48
See application file for complete search history.

(56) References Cited

U.S. PATENT DOCUMENTS

| | | | | |
|---|---|---|---|---|
| 2,729,905 | A * | 1/1956 | Crozier | D06F 81/00 108/63 |
| 3,677,569 | A * | 7/1972 | Larson | B62B 3/02 280/32.6 |
| 4,580,799 | A * | 4/1986 | Quinonez | A47C 9/022 280/32.6 |
| 5,330,211 | A * | 7/1994 | Nicholson | B25H 5/00 280/32.6 |
| 7,032,908 | B2 * | 4/2006 | Melvin | B25H 5/00 280/32.6 |
| 8,025,299 | B2 * | 9/2011 | Hiltz | B25H 5/00 280/32.6 |
| 8,505,138 | B1 * | 8/2013 | Minichiello | A47C 16/00 5/632 |
| 9,486,914 | B1 * | 11/2016 | Frolander | A47C 16/005 |
| 10,549,418 | B1 * | 2/2020 | Cook | B25H 5/00 |
| 10,661,431 | B1 * | 5/2020 | Hightower | B25H 5/00 |
| 10,875,560 | B2 * | 12/2020 | Frolander | B62B 5/08 |
| 11,235,794 | B1 * | 2/2022 | Ciccarelli | B62B 3/002 |

(Continued)

*Primary Examiner* — James M Dolak
(74) *Attorney, Agent, or Firm* — Hartman Global IP Law; Gary M. Hartman; Domenica N.S. Hartman

(57) ABSTRACT

Apparatuses and methods for accessing confined spaces while in a supine position. Such an apparatus includes a platform with base and cantilever portions configured in combination to support a user in a supine position, and at least two sets of wheel assemblies coupled to the base portion of the platform and spaced apart from each other in a lengthwise direction of the base portion. The base portion of the platform is configured to balance a body weight of the user over and between the two sets of wheel assemblies. The cantilever portion of the platform is configured to support the user's head and to be cantilevered from a forward-most end of the base portion of the platform.

10 Claims, 9 Drawing Sheets

(56) References Cited

U.S. PATENT DOCUMENTS

| 11,254,339 B1* | 2/2022 | Howard | B62B 15/007 |
| 2003/0075384 A1* | 4/2003 | Pickering | B25H 5/00 |
| | | | 182/116 |
| 2005/0204967 A1* | 9/2005 | Wrinkle | B25H 5/00 |
| | | | 108/146 |
| 2011/0049822 A1 | 3/2011 | Hinman | |

* cited by examiner

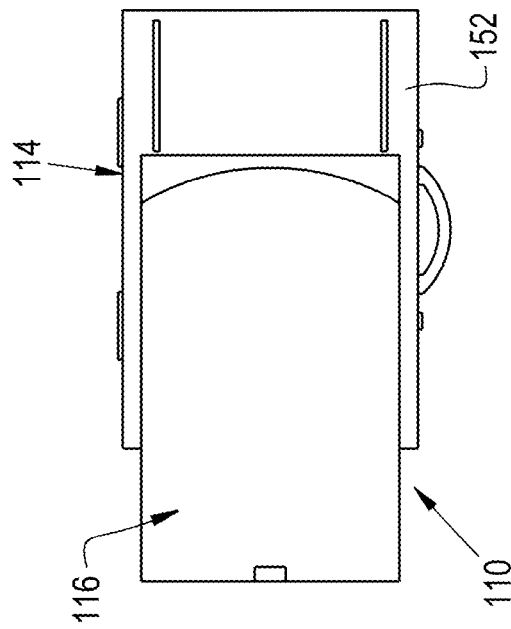
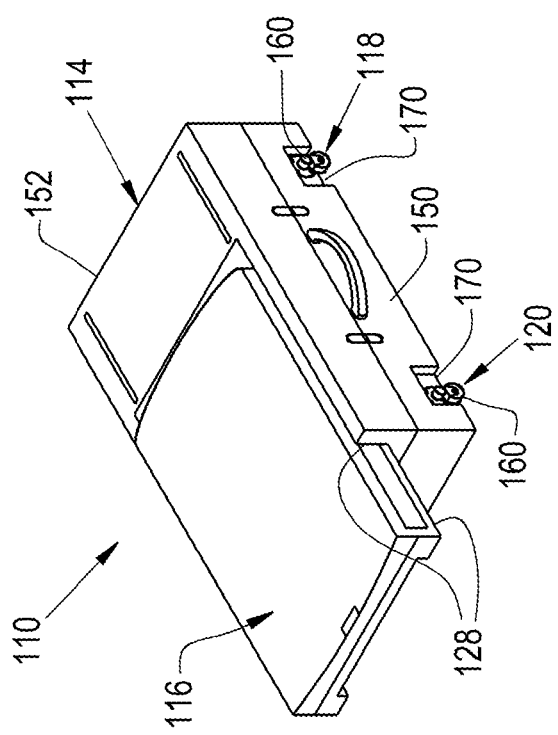
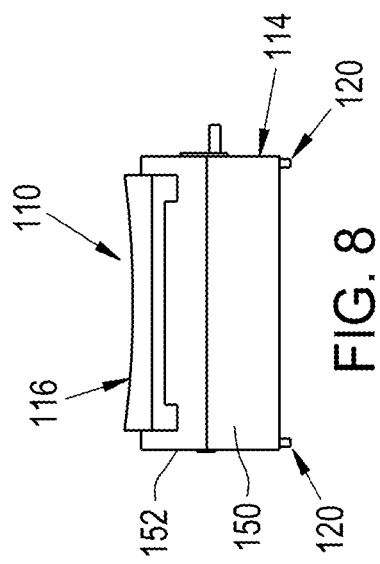

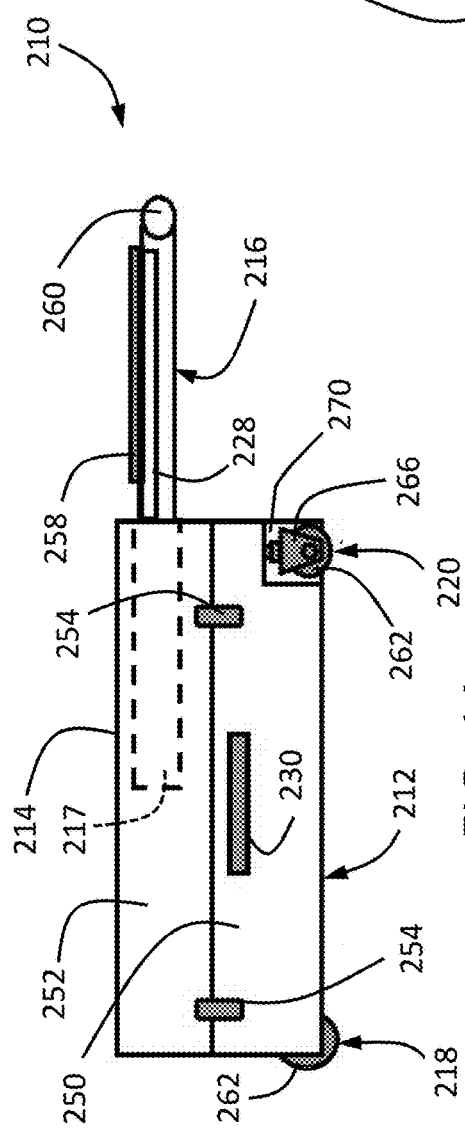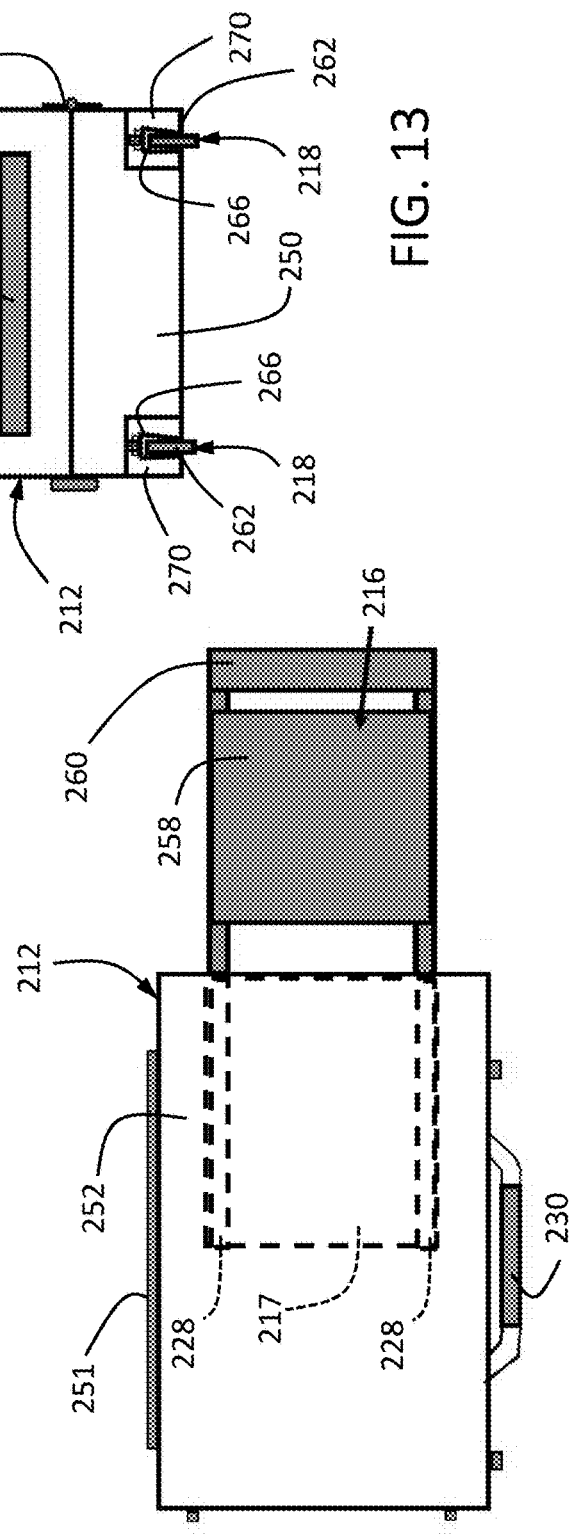

APPARATUSES AND METHODS FOR ACCESSING SPACES LOCATED ABOVE LOW-PROFILE OBSTRUCTIONS

CROSS-REFERENCE TO RELATED APPLICATIONS

This application claims the benefit of U.S. Provisional Application No. 62/943,907, filed Dec. 5, 2019, the contents of which are incorporated herein by reference.

BACKGROUND OF THE INVENTION

The present invention generally relates to wheeled low-profile equipment for supporting a user while in a supine position. The invention particularly relates to wheeled low-profile apparatuses capable of extending over low-profile obstructions to enter confined spaces, as a nonlimiting example, extending over a base (or other raised lower portion) of a base cabinet or a face frame of a base cabinet to enable a user to work on hardware within the interior of the cabinet, for example, plumbing hardware. Other nonlimiting examples include accessing confined spaces while working on or around automobiles and computer equipment.

For a conventional sink mounted on a base cabinet, plumbing hardware such as drains and water lines are usually located within the interior of the cabinet below the sink. In order to install or repair such plumbing hardware, it is common for an individual to lie in a supine position with their head located within the cabinet interior below the sink. While such a position may provide access to plumbing hardware within the confined space of a cabinet interior, individuals often experience discomfort while doing so, especially if there is a low obstruction to the cabinet interior, for example, if the cabinet has a face frame or the entry to cabinet interior is raised above the surrounding floor level, for example, as a result of the cabinet having a base. Base cabinets are often raised for ease of installation, to reduce the likelihood of water damage, and/or to provide room for a toe kick.

In view of the above, it can be appreciated that it would be desirable if apparatuses and methods were available for assisting individuals in accessing confined spaces in a supine position, particularly where there is a low obstruction adjacent the confined space, as is often the case with base cabinets.

BRIEF DESCRIPTION OF THE INVENTION

The present invention provides apparatuses and methods suitable for accessing confined spaces while in a supine position.

According to one aspect of the invention, an apparatus is provided that includes a platform with base and cantilever portions configured in combination to support a user in a supine position, and at least first and second sets of wheel assemblies coupled to the base portion of the platform and spaced apart from each other in a lengthwise direction of the base portion. The base portion of the platform is configured to balance a body weight of the user over and between the first and second sets of wheel assemblies. The cantilever portion of the platform is configured to support the user's head and to be cantilevered from a forward-most end of the base portion of the platform.

According to another aspect of the invention, a method is provided for accessing a space located above a low-profile obstruction while lying in a supine position. The method includes providing an apparatus comprising a platform with base and cantilever portions and at least two sets of wheel assemblies coupled to the base portion of the platform and spaced apart from each other in a lengthwise direction of the base portion, orienting the apparatus in an expanded configuration wherein the cantilever portion of the platform is cantilevered from a forward-most end of the base portion of the platform, lying on the platform in a supine position such that one's body weight is balanced on the base portion of the platform and one's head rests on the cantilever portion of the platform, and maneuvering the apparatus on the two sets of wheel assemblies into the space while in the supine position, wherein the base portion is located over the obstruction.

Technical effects of apparatuses and methods as described above preferably include the ability to access confined spaces in a supine position despite obstructions adjacent and at the entry to the confined space. A nonlimiting example is accessing an interior space of a base cabinet, in which the cantilever portion of the platform is positioned over a raised lower portion of the cabinet.

Other aspects and advantages of this invention will be further appreciated from the following detailed description.

BRIEF DESCRIPTION OF THE DRAWINGS

FIGS. 5, 6, 7, and 8 schematically represent side, perspective, top, and end views, respectively, showing an apparatus in accordance with a second nonlimiting embodiment of the invention.

FIGS. 11, 12, and 13 schematically represent side, top, and end views, respectively, showing an apparatus in accordance with a third nonlimiting embodiment of the invention.

DETAILED DESCRIPTION OF THE INVENTION

Figure 1:
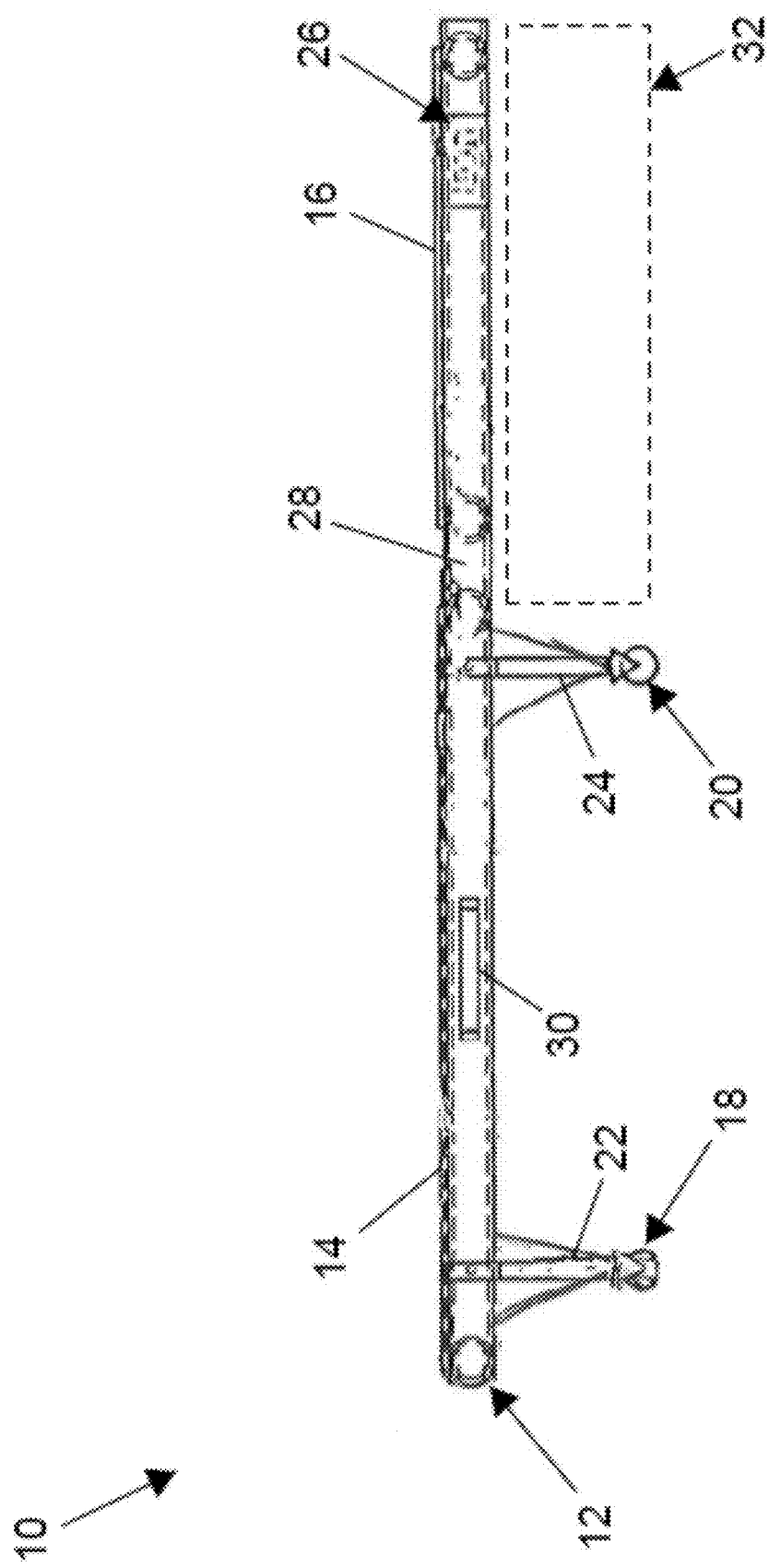
FIG. 1 schematically represents a side view of an apparatus in an expanded configuration in accordance with a first nonlimiting embodiment of the invention.
Figure 2:
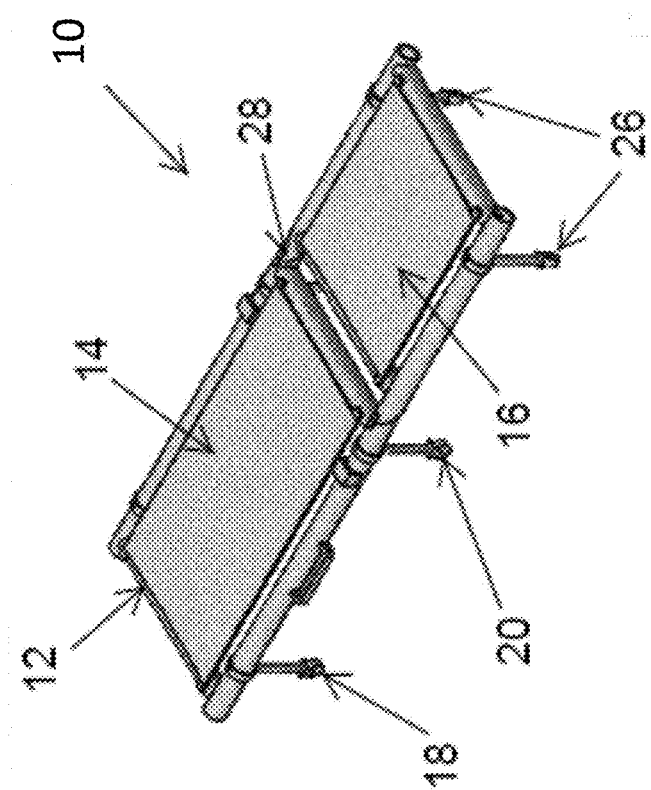
FIGS. 2 and 3 schematically represent perspective views of the apparatus of FIG. 1 in its expanded configuration (FIG. 2) and a collapsed configuration (FIG. 3).

FIGS. 1 through 14 represent nonlimiting embodiments of apparatuses configured for promoting comfortable access to confined spaces, particularly those having low-profile obstructions to them. As used herein, a confined space is a space with a limited volume and having an opening thereto with a limited cross-sectional area for entry and egress. In general, the apparatuses include platforms on which a user is able to rest in a supine position, and wheels attached to the platforms that allow the user to easily maneuver the apparatuses adjacent a confined space and insert a cantilever portion of the apparatus through the opening of the confined space. For convenience, the apparatuses will be discussed in reference to accessing plumbing hardware below and coupled to a typical sink located within a base cabinet. However, it is foreseeable and within the scope of the invention that the apparatuses may be used for other applications and to access other confined, partially confined, or open spaces and may be used to pass above and avoid various obstructions adjacent to such spaces. As nonlimiting examples, it is foreseeable that the apparatuses can find use when working within a space beneath or adjacent to an automobile or computer equipment.

To facilitate the description provided below of the embodiments represented in the drawings, relative terms, including but not limited to, "vertical," "horizontal," "lengthwise," "lateral," "front," "rear," "side," "forward," "rearward," "upper," "lower," "above," "below," "upward," "downward," etc., may be used in reference to an orientation of the apparatuses during their use and operation, and therefore are relative terms that are useful to describe the apparatuses represented in the drawings.

Figure 3:
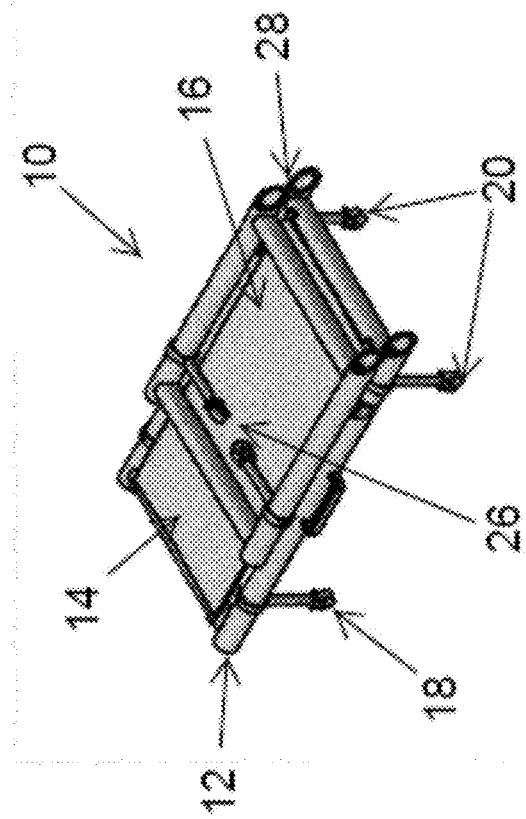
Figure 4:
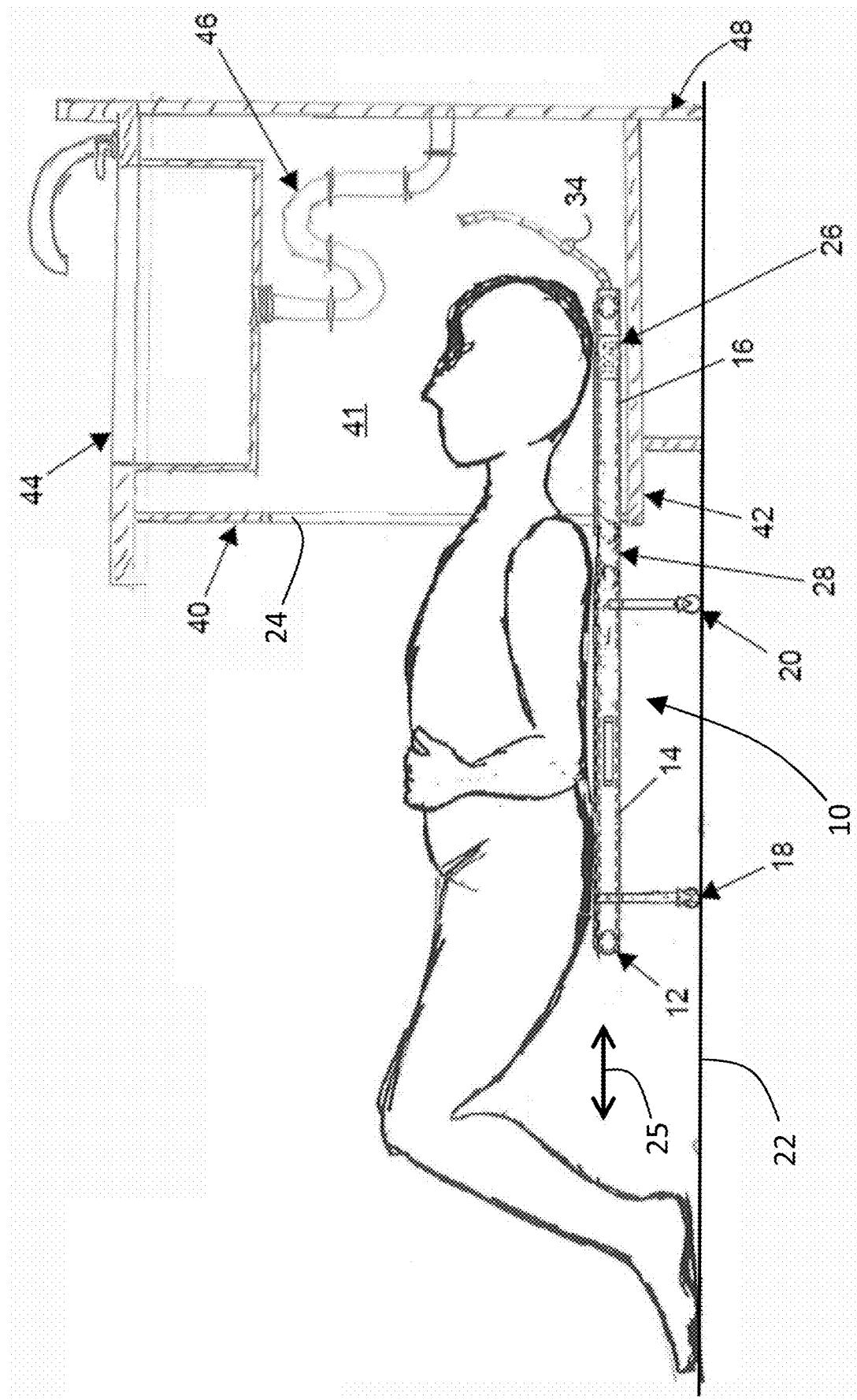
FIG. 4 represents the use of the apparatus of FIGS. 1 through 3 to access a confined space within the interior of a base cabinet.
Figure 5:
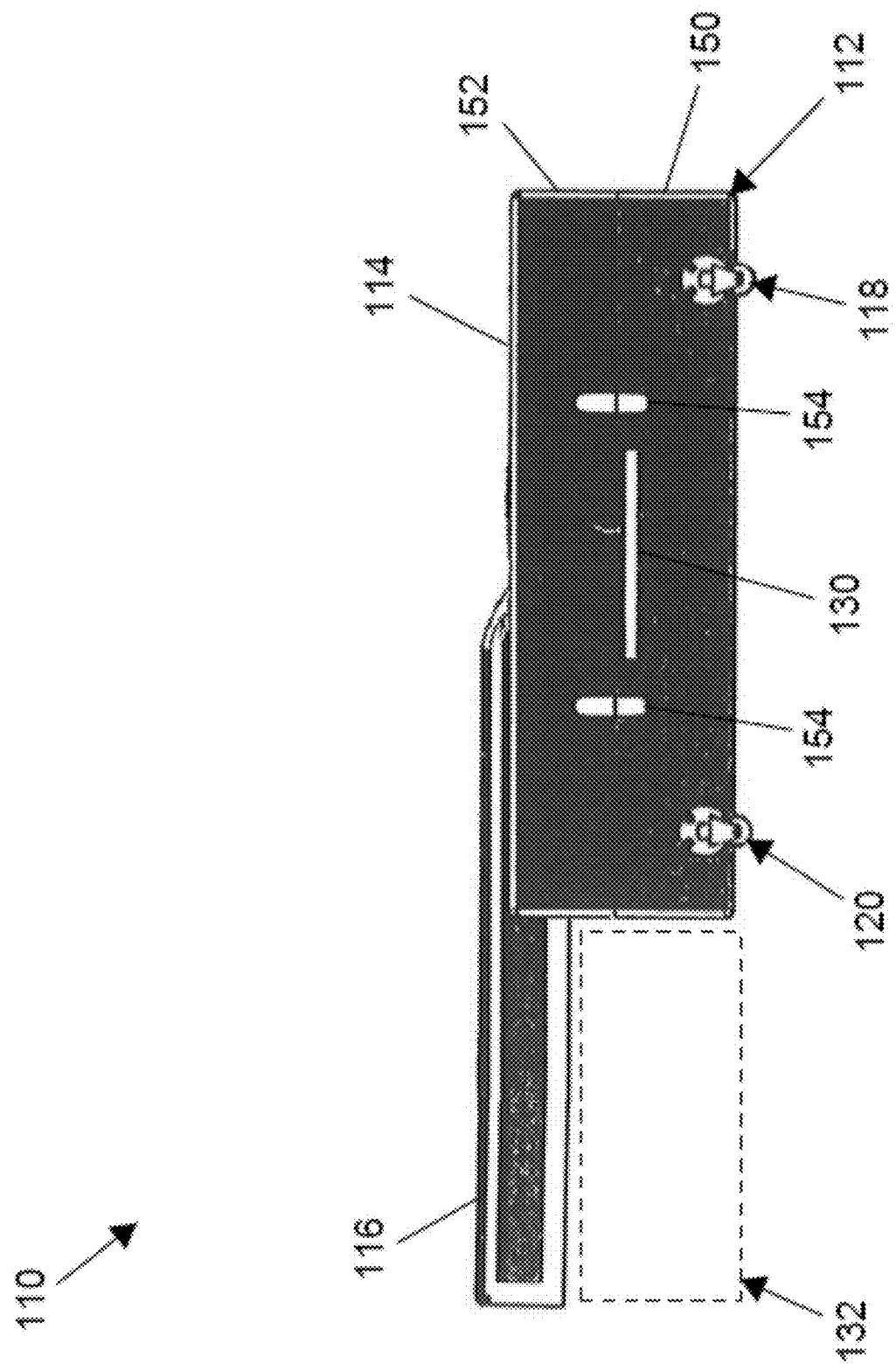

FIGS. 1 through 4 represent a first embodiment of an apparatus 10 that includes a platform 12 configured to provide a generally planar upper surface on which a user may rest in a generally supine position, as schematically depicted in FIG. 4. The platform 12 has first and second portions 14 and 16 that, for convenience, will be referred to as base and cantilever portions 14 and 16, respectively. In the embodiment represented in FIGS. 1 through 4, the base portion 14 of the platform 12 forms a rearward section of the apparatus 10 and is adapted and intended to support at least the user's torso (trunk), including the back and hips, and the cantilever portion 16 of the platform 12 forms a forward section of the apparatus 10 and is configured and intended to support the user's neck and head as depicted in FIG. 4. The cantilever portion 16 is coupled to and extends from the base portion 14 at an intermediate region of the platform 12 that is adapted to support at least a portion of the user's shoulders, as depicted in FIG. 4.

The base and cantilever portions 14 and 16 shown in FIGS. 1 through 4 are pivotally connected to enable the cantilever portion 16 to fold back onto the base portion 14 (FIG. 3), enabling the platform 12 to transition or be reconfigured between an expanded configuration (FIGS. 1, 2, and 4) and a collapsed configuration (FIG. 3) in which the entirety of the cantilever portion 16 may be above the base portion 14. In the example represented in FIGS. 1 through 4, the base and cantilever portions 14 and 16 are coupled with a hinge 28 configured to allow the cantilever portion 16 to pivot such that an upper surface thereof contacts or is immediately adjacent to an upper surface of the base portion 14. In such an embodiment, the apparatus 10 may include a locking mechanism (not shown) for securing the platform 12 in the expanded and/or collapsed configurations. Furthermore, such a locking mechanism may be configured to secure the cantilever portion 16 of the platform 12 at an incline relative to the base portion 14, as nonlimiting examples, at angles ranging from about 15 to about 45 degrees, such that the user's head may be supported at a raised elevation relative to their trunk. Alternatively, it should be understood that the portions 14 and 16 could be rigidly connected without the ability to fold relative to each other.

The platform 12 is represented in FIGS. 1 through 4 as further having at least two sets of wheel assemblies 18 and 20 that are coupled to the base portion 14 of the platform 12 for maneuverability of the apparatus 10 on a surface 22 (as nonlimiting examples, a floor, the ground, etc.). The sets of wheel assemblies 18 and 20 are spaced apart from each other in a lengthwise direction of the base portion 14, with the wheels of the wheel assembly 20 being located closer to the cantilever portion 16 and the wheels of the wheel assembly 18 being located near the rearward end of the base portion 14. Each set of wheel assemblies 18 and 20 comprises at least a pair of wheels that are laterally spaced apart from each other to promote the balance and stability of the platform 12. A user lying on the apparatus 10 as represented in FIG. 4 may use their arms and/or legs to push against the surface 22 supporting the apparatus 10 to move the apparatus 10 on the wheels in directions parallel to the lengthwise of the apparatus 10, as indicated by the arrow 25 in FIG. 4. The wheels of either or both wheel assemblies 18 and 20 may be, but are not required to be, caster wheels. The apparatus 10 may include additional wheel assemblies coupled to the base portion 14 of the platform 12, each with various numbers of wheels. The platform 12 does not require wheel assemblies attached to the cantilever portion 16. However, the apparatus 10 represented in FIGS. 1 through 4 includes at least one additional wheel assembly 26 coupled to the cantilever portion 16 of the platform 12 to support the cantilever portion 16 on a surface in the same manner that the wheel assemblies 18 and 20 are able to support the base portion 14 on the same or adjacent surface 22. As shown in FIGS. 3 and 4, wheels of the wheel assembly 26 are foldable or otherwise retractable or adjustable to selectively create an unobstructed region 32 (generally identified with phantom lines in FIG. 1) below the cantilever portion 16.

FIG. 4 represents a user reclining on the apparatus 10 and accessing plumbing hardware 46 below a typical residential sink 44 located within the interior 41 of a base cabinet 40. The user may access this confined space by wheeling the cantilever portion 16, and in so doing, the user's head, through a doorway or opening 24 to the interior 41 of the cabinet 40. Such a position is common when installing or repairing plumbing hardware. However, without the use of the apparatus 10, such a position may be uncomfortable due in part to the individual resting against a raised lower portion 42 of the cabinet 40. FIG. 4 represents the raised lower portion 42 as the result of the cabinet 40 having a base 48, though it is foreseeable that the raised lower portion 42 could be the result of the cabinet 40 having a face frame surrounding the opening 24 to the cabinet interior 41.

In order to promote access to a confined space such as the interior 41 of the cabinet 40 represented in FIG. 4, the platform 12 is supported in a raised position by the wheel assemblies 18 and 20, and the cantilever portion 16 of the platform 12 is cantilevered from a forward-most end of the base portion 14 to which the cantilever portion 16 is coupled, in this example, by the hinge 28. Such a configuration provides the unobstructed region 32 below the cantilever portion 16 of the platform 12 that enables the cantilever portion 16 to clear the lower portion 42 of the cabinet 40 when entering the confined space of its interior 41. The dimensions of the unobstructed region 32 below the platform 12 may vary depending on the application. In the present example, the wheel assemblies 18 and 20 are preferably sufficiently long to support at least the cantilever portion 16 of the platform 12 above the surface 22 by at least three inches (about 8 cm), referred to herein as a clearance height, so that the cantilever portion 16 will clear the lower portion of a typical base cabinet, and the cantilever portion 16 preferably sufficiently extends from the base portion 14 such that a user may locate their head and neck entirely, and preferably portions of at least their shoulders, within the interior of a typical base cabinet without contacting the lower portion of the cabinet with the apparatus 10.

Since the platform 12 is intended to provide an unobstructed region 32 below the cantilever portion 16 of the platform 12 while the cantilever portion 16 is supporting the user's head and neck, the platform 12 is preferably configured to support and balance the center of gravity of the user's body weight over the base portion 14 of the platform 12 such that the cantilever portion 16 of the platform 12 does not tilt downward during use. For this purpose, the nonlimiting embodiment of FIGS. 1 through 4 shows the user's center of gravity (located within the user's trunk) located on the base portion 14 and between the wheel assemblies 18 and 20 of the base portion 14, with the user's shoulders being roughly centered over the wheel assembly 20 (generally on the aforementioned intermediate region of the platform 12 between its base and cantilever portions 14 and 16) and the user's hips being roughly centered over the wheel assembly 18 farthest from the cantilever portion 16. For typical sized adults, a suitable lengthwise distance between the sets of wheel assemblies 18 and 20 is about seventeen inches (about 43 cm), and a suitable length for the base portion 14 is about twenty-four inches (about 60 cm). For purposes of stability, a suitable cantilever length for the cantilever portion 16 (defined herein as the lengthwise distance between the center of the nearest set of wheels 20 of the base portion 14 and the most distal extent of the cantilever portion 16 from the nearest set of wheels 20) is roughly equal to or less than lengthwise distance between the sets of wheel assemblies 18 and 20. To provide adequate support for the user's head, a suitable length for the cantilever portion 16 is about fourteen inches (about 35 cm).

FIGS. 5 through 10 represent a second embodiment of an apparatus 110 for use in accessing confined spaces. In view of similarities between the first and second embodiments, the following discussion of the second embodiment will focus primarily on aspects of the second embodiment that differ from the first embodiment in some notable or significant manner. Other aspects of the second embodiment not discussed in any detail can be, in terms of structure, function, materials, etc., essentially as was described for the first embodiment. In the drawings, consistent reference numbers are used to identify the same or functionally related elements, but with a numerical prefix (1) added in FIGS. 5 through 10 to distinguish the second embodiment from the embodiment of FIGS. 1 through 4.

Similar to the first embodiment, the apparatus 110 includes a platform 112 on which a user may rest in a generally supine position, and first and second wheel assemblies 118 and 120 that allow the user to maneuver the apparatus 110 while resting thereon. In this embodiment, the first and second wheel assemblies 118 and 120 are mounted within recesses or wells 170 formed in the base portion 114 of the platform 112. The wheel assemblies 118 and 120 each comprise a wheel 160 mounted to a stationary or swivel fork that extends downward from the base 150 into the well 170. Additionally, the cantilever portion 116 of the platform 112 is slidably coupled to the base portion 114 with complementary tracks 128 (FIG. 9) to allow for adjustment of the extension of the cantilever portion 116 and therefore the depth of an unobstructed region 132 (generally identified with phantom lines in FIG. 5) below the cantilever portion 116. As evident from FIGS. 5 through 10, the cantilever portion 116 forms the top surface of the apparatus 110 in both the expanded and/or collapsed configurations. A locking mechanism may be provided to releasably secure the cantilever portion 116 in a fixed position relative to the base portion 114, preferably both in an expanded configuration represented in FIGS. 5, 6, 7, 8, and 10, and in a fully collapsed (retracted) configuration (not shown) in which the entirety of the cantilever portion 116 may be above the base portion 114 and preferably covers the base portion 114.

Figure 9:
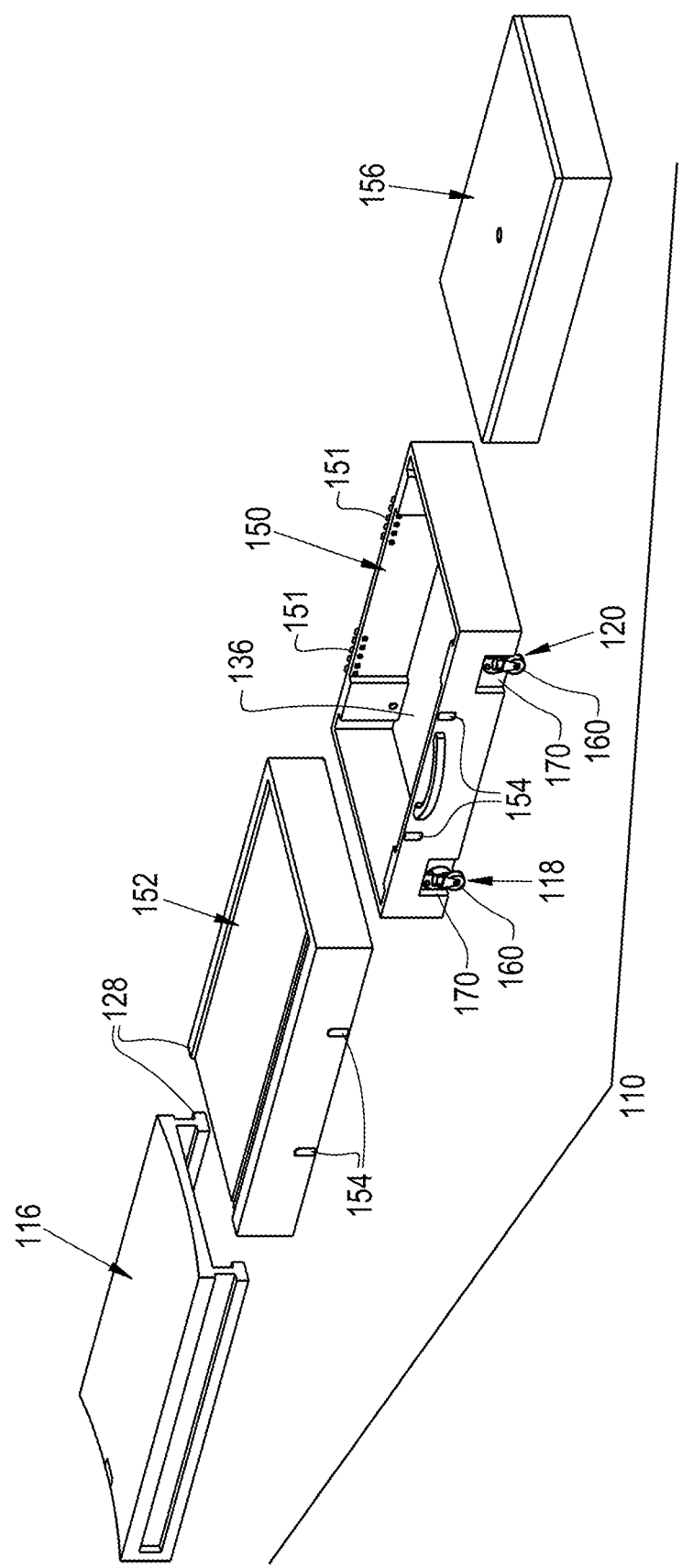
FIG. 9 schematically represents an exploded view of the apparatus of FIGS. 5 through 8.

The base portion 114 defines a housing with one or more accessible compartments 136 therein to provide a storage container such as but not limited to a toolbox. Such a configuration allows the apparatus 110 to function not only as a maneuverable platform 112 but also as a storage unit for items, including but not limited to the types of tools commonly used when installing or repairing plumbing hardware below a sink. The housing defined by the base portion 114 may have various shapes, include one or more compartments 136, and have various means of accessing the compartments 136. In the embodiment represented in FIGS. 5 through 10, the housing is separated into a base 150 and a lid 152 which are coupled with hinges 151 such that the lid 152 is able to pivot relative to the base 150 between open and closed configurations. The front side of the housing includes locking mechanisms 154 to secure the base 150 and lid 152 in the closed configuration represented in FIGS. 5, 6, 7, 8, and 10. As shown in FIG. 9, the base 150 and lid 152 may be sized to contain a tray 156 to organize and secure items stored within the compartment 136 of the base portion 114.

FIGS. 11 through 14 represent a third embodiment of an apparatus 110 for use in accessing confined spaces. In view of similarities between the first, second, and third embodiments, the following discussion of the third embodiment will focus primarily on aspects of the third embodiment that differ from the second embodiment in some notable or significant manner. Other aspects of the third embodiment not discussed in any detail can be, in terms of structure, function, materials, etc., essentially as was described for the second embodiment. In the drawings, consistent reference numbers are used to identify the same or functionally related elements, but with the numerical prefix (1) used in FIGS. 5 through 10 replaced with the numerical prefix (2) in FIGS. 11 through 14 to distinguish the third embodiment from the second embodiment of FIGS. 5 through 10.

Similar to the second embodiment, the apparatus 210 includes a platform 212 on which a user may rest in a generally supine position, and first and second wheel assemblies 218 and 220 that are mounted within recesses or wells 270 formed in the base 250 of the base portion 214 of the platform 212. Also similar to the second embodiment of FIGS. 5 through 10, the cantilever portion 216 of the platform 212 is slidably coupled to the base portion 214 with complementary tracks (FIGS. 11 and 12) to allow for adjustment of the extension of the cantilever portion 216 and therefore the depth of an unobstructed region below the cantilever portion 216. In contrast to the second embodiment of FIGS. 5 through 10, the cantilever portion 216 slidably retracts into a pocket 217 that is within the lid 252 and has an opening at the forward-most end of the base portion 214 so that only a handle 260 of the cantilever portion 216 is exposed outside of the base portion 214 when the cantilever portion 216 is in its fully collapsed (retracted) configuration. As a result, the lid 252 forms the top surface of the apparatus 210 in both the expanded and/or collapsed configurations.

Other differences between the third embodiment and second embodiment include a cushion 258 provided at the upper surface of the cantilever portion 216, and the configuration and placement of the first and second wheel assemblies 218 and 220. The wells 270 of the first (rearwardmost) wheel assemblies 218 are formed in the rearmost edge of the base 250 of the base portion 214, and the first wheel assemblies 218 protrude rearward and downward from the rearmost edge of the base 250. The wells 270 of the second (forward-most) wheel assemblies 220 are formed in the forward-most edge of the base 250, and the second wheel assemblies 220 protrude downward from the base 250 but do not protrude forward of the forward-most edge of the base 250 but instead the forward-most extent of each wheel 262 is substantially flush with the forward-most edge of the base 250 to maximize the stability of the platform 212 without limiting or interfering with the insertion of the cantilever portion 216 into an opening to the cabinet interior. Another feature of the second wheel assemblies 220 is that they are vertically adjustable, as particularly evident from FIG. 14 which shows one of the wheel assemblies 220 within its well 270. The wheel assembly 220 comprises the wheel 260, the stationary fork 266, an axle 264 that mounts the wheel 260 to the stationary fork 266, and a threadably adjustable post 268 that extends downward from the base 250 into the well 270 and mounts the fork 266 and other components of the wheel assembly 220 to the base 250. This adjustability enables the wheel assemblies 220 to be movable upward and downward, which enables the clearance beneath the cantilever portion 216 to be tailored to clear the height of an obstruction (for example, the lower portion of a cabinet) when entering a confined space (for example, the interior of a cabinet).

Figure 10:
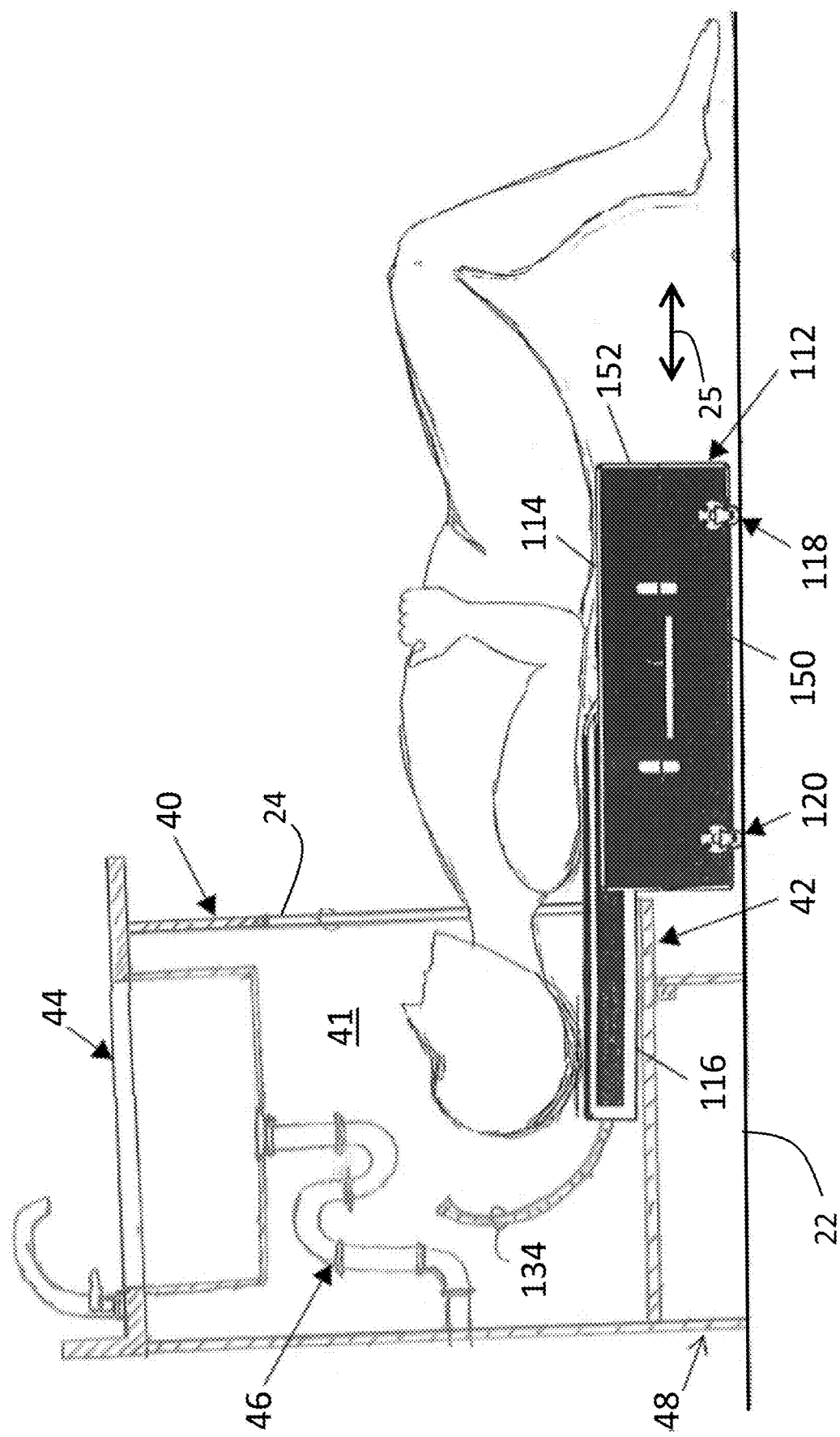
FIG. 10 schematically represents the use of the apparatus of FIGS. 5 through 9 to access a confined space within the interior of a base cabinet.
Figure 14:
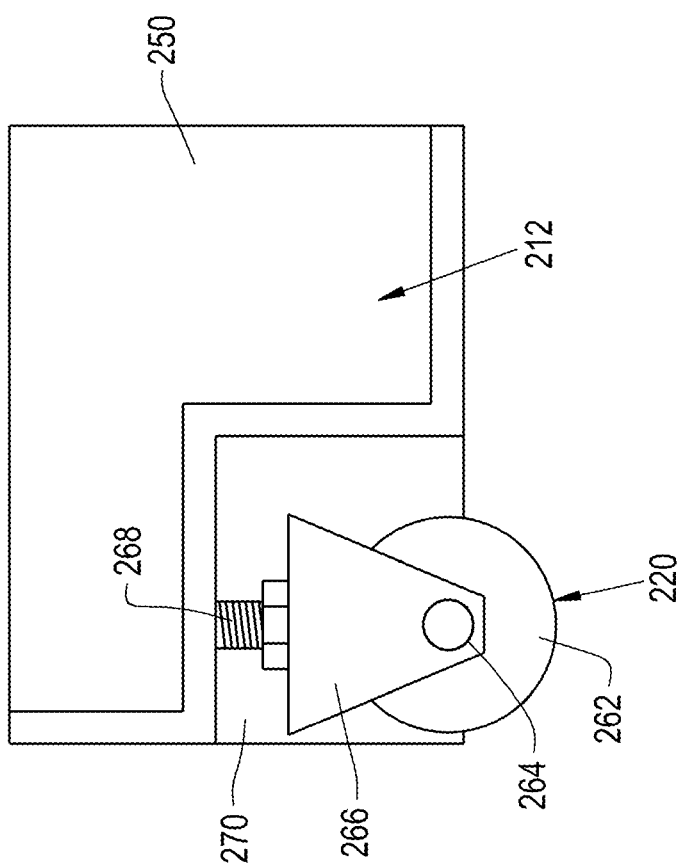
FIG. 14 schematically represents a detailed view of the apparatus of FIGS. 11 through 13.

The apparatuses 10, 110, and 210 may include various additional structures/features to facilitate their use or assist with activities performed during their use. For example, FIGS. 4 and 10 represent the apparatuses 10 and 110 as including light sources 34 and 134 (in this instance, adjustable snake-type lights) coupled to ends of their cantilever portions 16 and 116 in order to provide hands-free lighting when working in confined spaces. The drawings also represent the apparatuses 10, 110, and 210 as including handles 30, 130, and 230 suitable for carrying the apparatuses 10, 110, and 210 when in their collapsed/retracted configurations.

The apparatuses 10, 110, and 210 may be formed of various materials including but not limited to those commonly used to construct conventional mechanic's trolleys (creepers). For example, the platforms 12 and 112 may be formed of metallic and/or polymeric materials with foam, canvas, or another material on upper surfaces of the platform 12 and 112 for padding.

While the invention has been described in terms of specific or particular embodiments, it should be apparent that alternatives could be adopted by one skilled in the art. For example, the apparatuses 10, 110, and 210 and their components could differ in appearance and construction from the embodiments described herein and shown in the drawings, functions of certain components of the apparatuses 10, 110, and 210 could be performed by components of different construction but capable of a similar (though not necessarily equivalent) function, and various materials could be used in the fabrication of the apparatuses 10, 110, and 210 and/or their components. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments represented in the drawings, and not necessarily to serve as limitations to the scope of the invention. Therefore, the scope of the invention is to be limited only by the following claims.

The invention claimed is:

1. An apparatus comprising:
    a platform having a base portion and a cantilever portion that together support a user in a supine position, the base portion and the cantilever portion having complementary tracks that slidably couple the cantilever portion to the base portion so that the cantilever portion slidably extends from and retracts toward to the base portion and extension of the cantilever portion from the base is adjustable; and
    at least first and second sets of wheel assemblies coupled to the base portion of the platform and spaced apart from each other in a lengthwise direction of the base portion so that, while the user is supported in the supine position on the platform, the base portion of the platform balances a body weight of the user over and between the first and second sets of wheel assemblies;
    wherein the cantilever portion is slidably coupled to the base portion with the complementary tracks so that the platform has a collapsed configuration in which the cantilever portion is above the base portion and an upper surface of the cantilever portion forms a top surface of the apparatus, and the platform has an expanded configuration in which the cantilever portion of the platform is extended and cantilevered from a forward-most end of the base portion of the platform and the upper surface of the cantilever portion supports the user's head and neck while the user is in the supine position on the platform.

2. The apparatus of claim 1, wherein the cantilever portion lacks wheels mounted thereto.

3. The apparatus of claim 1, wherein the base portion comprises a pocket therein having an opening at the forward-most end of the base portion, the cantilever portion is slidably receivable into the pocket such that the platform is configurable between an expanded configuration in which the cantilever portion extends from the base portion and a collapsed configuration in which the cantilever portion is received within the pocket except for a handle of the cantilever portion that is exposed outside of the base portion.

4. The apparatus of claim 1, wherein the first set of wheel assemblies is a rearward-most set of wheel assemblies, the second set of wheel assemblies is a forward-most set of wheel assemblies, the first set of wheel assemblies is located in first wells formed in a rearmost edge of the base portion, and the second set of wheel assemblies is located in second wells formed in the base portion adjacent a forward-most edge of the base portion.

5. The apparatus of claim 4, wherein the first set of wheel assemblies protrude rearward and downward from the rearmost edge of the base portion, and the second set of wheel assemblies protrude downward from the base portion but do not protrude forward of the forward-most edge of the base portion and instead forward-most extents of the second set of wheel assemblies are substantially flush with the forward-most edge of the base portion.

6. The apparatus of claim 5, wherein at least the second set of wheel assemblies is vertically adjustable.

7. The apparatus of claim 1, wherein the base portion comprises a base and a lid pivotably attached to the base, the base comprises a housing and a storage compartment within the housing, and the complementary tracks slidably couple the cantilever portion to the lid at the forward-most end of the base portion such that the platform is configurable between the expanded configuration in which the cantilever portion extends from the lid and the collapsed configuration in which the cantilever portion is above the lid.

8. The apparatus of claim 1, further comprising an additional wheel assembly coupled to the cantilever portion of the platform and having wheels that are retractable to provide clearance below the cantilever portion of the platform.

9. The apparatus of claim 1, wherein the cantilever portion has a cantilever length equal to or less than a lengthwise distance between the first and second sets of wheel assemblies.

10. The apparatus of claim 1, wherein the first and second sets of wheel assemblies and the cantilever portion cooperate to establish a clearance height for the cantilever portion of at least 8 centimeters.

\* \* \* \* \*